United States Patent [19]

Hughes

[11] Patent Number: 5,133,630
[45] Date of Patent: Jul. 28, 1992

[54] FASTENER FOR THERMOPLASTICS

[75] Inventor: Barry J. Hughes, Wickford, R.I.

[73] Assignee: Research Engineering & Manufacturing, Inc., Middletown, R.I.

[21] Appl. No.: 680,300

[22] Filed: Apr. 4, 1991

[51] Int. Cl.⁵ .................. F16B 37/04; F16B 39/02
[52] U.S. Cl. ............................ 411/82; 411/180; 411/311; 411/930; 29/456
[58] Field of Search .............. 411/180, 181, 301, 302, 411/310, 311, 411, 424, 901–903, 908, 82, 930; 29/456, 525.1; 156/66

[56] References Cited

U.S. PATENT DOCUMENTS

| | | | |
|---|---|---|---|
| 1,829,974 | 11/1931 | Williams . | |
| 2,145,168 | 1/1939 | Flagg | 113/112 |
| 2,237,137 | 11/1941 | Oestereicher . | |
| 2,301,181 | 11/1942 | Ilsemann . | |
| 2,355,486 | 8/1944 | Tinnerman . | |
| 2,484,645 | 10/1949 | Baumle . | |
| 3,643,722 | 2/1972 | Oestereicher . | |
| 3,856,065 | 12/1974 | Gehring . | |
| 3,875,780 | 4/1975 | Cochrum et al. | 411/311 |
| 3,897,713 | 8/1975 | Gugle | 411/301 |
| 4,046,181 | 9/1977 | Barnsdale | 411/180 |
| 4,164,971 | 8/1979 | Strand | 411/301 |
| 4,508,759 | 4/1985 | Wallace | 411/301 |
| 4,623,401 | 11/1986 | Derbyshire et al. | 148/13 |
| 4,720,225 | 1/1988 | Burt | 441/329 |
| 4,941,788 | 7/1990 | Highfield | 411/180 |

FOREIGN PATENT DOCUMENTS 2917934 11/1980 Fed. Rep. of Germany .
1279452 6/1972 United Kingdom .

Primary Examiner—Neill R. Wilson
Attorney, Agent, or Firm—Trexler, Bushnell, Giangiorgi & Blackstone, Ltd.

[57] ABSTRACT

A thread-forming fastener and method of installation thereof are provided for use with a workpiece constructed of a thermoplastic material. The fastener includes a threaded shank having a thread of desired form and a driver head portion. A metallic coating of a predetermined composition is applied to the threaded shank. The composition of the coating is selected for its effective Curie temperature for heating the fastener during application of the fastener to the thermoplastic workpiece. The heated surface enhances plastic flow of the thermoplastic material during thread forming and effectively reduces the required drive torque for thread forming by the fastener while increasing the holding torque. The fastener is preferably also formed with a spaced thread defining an unthreaded surface portion running adjacent to the thread at substantially the root diameter of the thread. At least one radially outwardly extending ramp-like ratchet tooth is formed in at least one part of the unthreaded shank portion oriented for resisting rotation of the fastener relative to the workpiece.

10 Claims, 2 Drawing Sheets

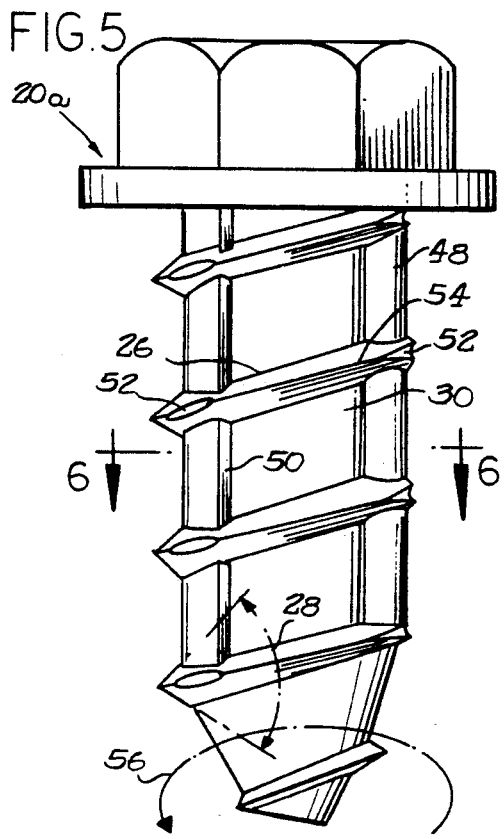
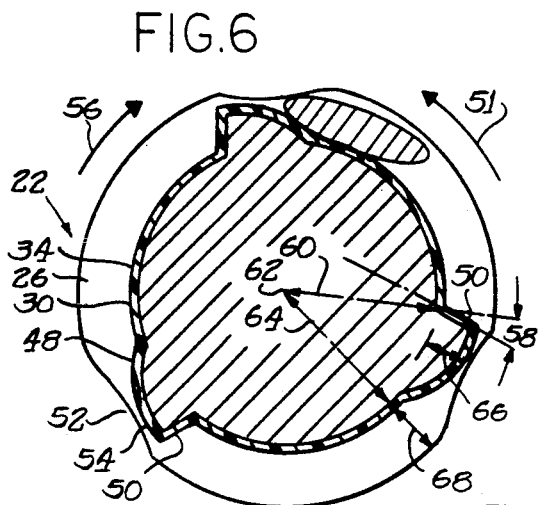
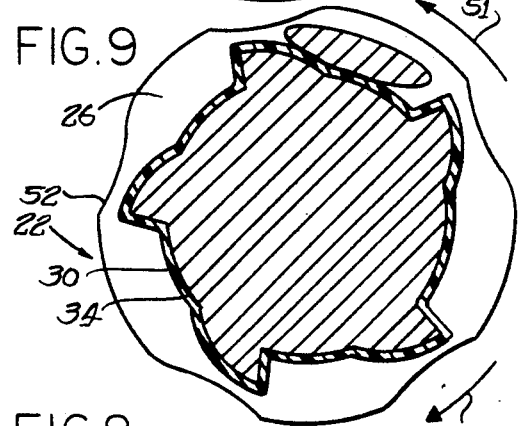
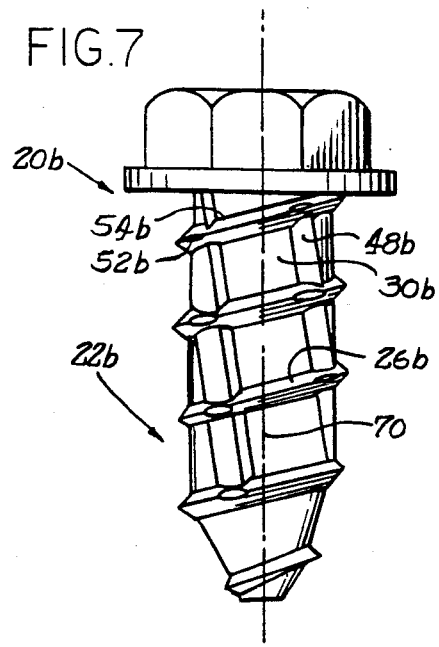
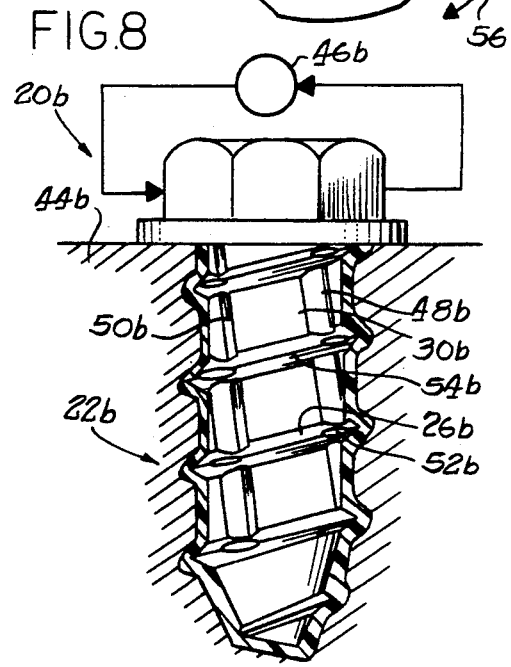

FASTENER FOR THERMOPLASTICS

BACKGROUND OF THE INVENTION

This invention relates to the thread-forming fastener arts and more specifically to thread-forming fasteners for use with thermoplastics.

Thermoplastics are extremely important in manufacturing because of this relatively low cost, high degree of formability, corrosion resistance, and ease of conversion from raw material to final finished product. Thermoplastics are useful in applications including automotive, medical, recreational and disposable products. New compositions of thermoplastics are constantly being developed including materials which are reinforced with glass, carbon or other strengthening fibers. Often it is desirable to attach other structures to a body formed of thermoplastic or to attach the thermoplastic body itself to another structure.

When installing thread forming fasteners to thermoplastic materials, inherent problems of the thermoplastic materials are encountered, including a relatively high drive torque required to drive such fasteners combined with a low holding torque upon installation in such materials as well as the notch sensitivity of such materials at ambient temperatures. The combination of high drive torque and notch sensitivity results in thermoplastic materials being highly susceptible to crack formation upon the installation of thread forming fasteners. Such cracking is extremely prevalent when fastener installation is required in thin wall sections of thermoplastic material where material thickness and notch sensitivity combined with a high drive torque results in crack propagation.

Attempts have been made to overcome the cracking problems and/or subsequent loosening resulting under high drive torque, low holding torque and notch sensitivity. One solution to the problem of crack propogation and thin wall sections was to apply various sealants and/or adhesives. However, many times an adhesive does not prove sufficiently reliable and may not be able to tolerate either tensile or torsional forces. Further, such measures require additional materials as well as added time and labor in installation. In cost effective automotive or other assembly operations, time and labor must be optimized, and therefore such additional steps are undesirable.

Another attempt to overcome the problems of utilizing thread-forming fasteners with thermoplastics employed drilling and threading or tapping each individual hole into which a fastener was to be applied. However, such procedures are extremely expensive due to the additional time and tooling required for this additional tapping operation. Further, since the thread-tapping operation is very similar to a thread forming fastener being driven into a pilot hole, crack propagation and attendant problems may still occur.

Yet another attempt to overcome the problem of fastener attachment to thermoplastics was to mold fastener inserts or nuts directly into the thermoplastics body. However, this solution is impractical in many applications because of assembly requirements which are not conducive to preassembly of inserts, or because of the size or type of part to be manufactured, or the necessity to specifically locate each fastener, depending on the specific part, assembly and application. Further, even if the application was conducive to molding inserts into the thermoplastic body, such an operation can be overly costly. Molding inserts into thermoplastic requires additional set up and worker time. Additionally, such operations require special equipment and tooling to accommodate the inserts. Such measures may not prove cost effective.

Finally, even if the fasteners were applied to a drilled and tapped thermoplastic body or to inserts molded into the body, a fastener may to vibrate loose from the thermoplastic body since these methods may not reliably securely retain the fastener within the thermoplastic body.

Therefore, it is highly desirable to provide a fastener and method for applying such a fastener to a thermoplastic body which will not promote crack, propagation and preferably will reduce drive torque in applying such a fastener to a thermoplastic body and yet increase holding torque following installation. Heretofore, it is believed that no prior art device or method has resolved the above-noted problems associated with thermoplastics.

OBJECTS AND SUMMARY OF THE INVENTION

A general object of the present invention is to provide a thread-forming fastener and method for installing such a fastener in a thermoplastic body which prevents crack propagation, reduces drive torque and increases holding torque.

Yet another object of the present invention is to provide a fastener and method for installing such a fastener which results in relieving residual stresses in the thermoplastic body when such a fastener is installed.

Still another object of the present invention is to provide a fastener and a method for installing such a fastener which results in securing the fastener in a thermoplastic body such that it resists counterrotation once it is installed in a thermoplastic body.

Briefly, and in accordance with the foregoing objects, the present invention comprises a thread-forming fastener and a method of installing such a fastener in a workpiece constructed of a thermoplastic material. The fastener comprises a threaded shank portion having a thread of a desired form and a driver head attached thereto. In accordance with one embodiment of the invention, the threaded shank portion is coated with a coating material which has a preselected Curie temperature and which may be heated during the application of the fastener to the workpiece to enhance the flow of the thermoplastic material around the fastener while the fastener is being installed in the workpiece. The heating of the coating through Curie temperature heating reduces the drive torque and promotes plastic flow of the thermoplastic around the fastener. However, heating of the fastener by other means during driving is also within the scope of this embodiment. In another embodiment of the invention, the fastener is formed with a spaced thread having one or more ramp-like ratchet teeth in the spaces between the thread courses which resist counterrotation of the fastener once it is driven into a thermoplastic workpiece.

BRIEF DESCRIPTION OF THE DRAWINGS

The organization and manner of the operation of the invention, together with the objects and advantages thereof, may be understood best by reference to the following description taken in connection with the accompanying drawings wherein like reference numerals identify like elements in which:

FIG. 5 is a side elevation view of a fastener having a head portion and a threaded shank portion with radially outwardly extending ramp-like ratchet teeth formed between spaced apart thread;

FIG. 6 is a cross-sectional view of the fastener taken along line 6—6 in FIG. 5 further illustrating a coating applied to the outer surface of the threaded shank;

FIG. 7 is a side elevation view of a fastener having a head portion and a threaded shank portion with radially extending ramp-like ratchet teeth, formed with a spiral relation to a central axis and between spaced apart threads; and FIG. 8 is a side view of a fastener as show in FIG. 7 installed in a workpiece with energy applied to the fastener as shown in FIG. 4 in which thermoplastic material has flowed around the threaded shank and ramp-like ratchet teeth of the fastener.

FIG. 9 is a cross-sectional view similar to FIG. 6 illustrating an alternative ratchet tooth configuration.

DETAILED DESCRIPTION OF THE ILLUSTRATED EMBODIMENT

While this invention may be susceptible to embodiment in different forms, the drawings illustrate specific embodiments which will be described herein in greater detail with the understanding that the present disclosure is to be considered an exemplification of the principles of the invention and is not intended to limit the invention to that which is illustrated.

Figure 1:
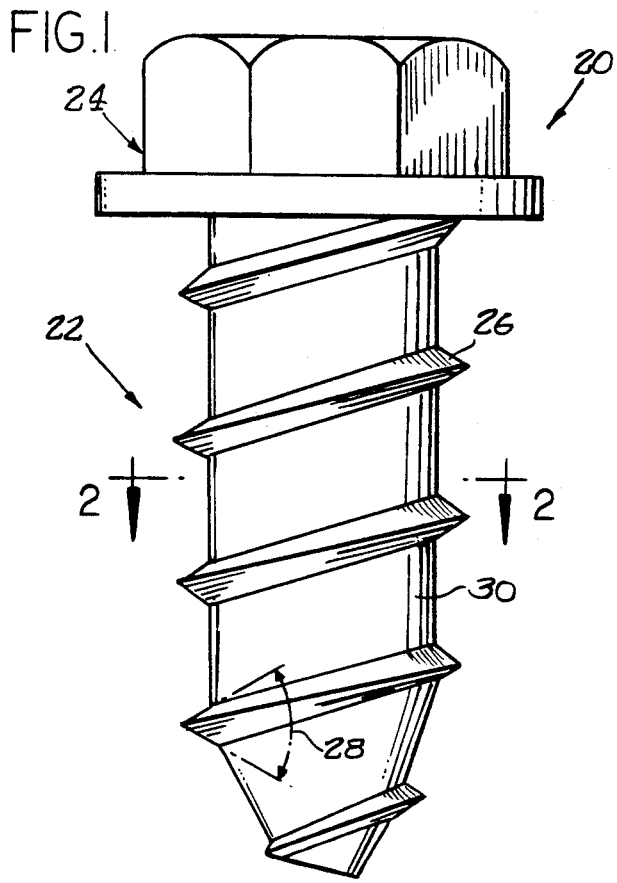
FIG. 1 is a side elevation view of a fastener having a head portion and a threaded shank portion, in accordance with of the invention.

Referring now to the drawings wherein like elements are designated by the same numerals throughout the figures, a thread-forming fastener 20 is shown in FIG. 1. The thread-forming fastener 20 is intended for use with a workpiece constructed of thermoplastic material. The fastener 20 is formed with a threaded shank portion 22 and a driver head portion 24. A spaced apart thread 26 is formed on the shank portion 22. A crest angle 28 of substantially on the order of from 30° to 60° is defined by the thread 26. An unthreaded surface portion 30 is defined in the area between the spaced apart thread 26, (i.e., running adjacent the thread 26) at substantially a root diameter 32 (see also, FIG. 2) of the thread 26.

Figure 2:
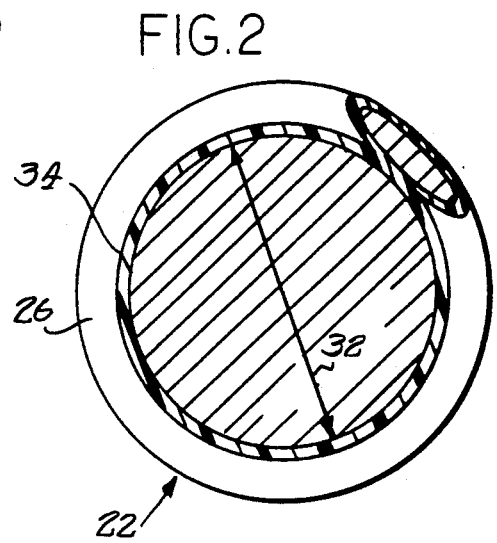
FIG. 2 is a cross-sectional view of the fastener taken along line 2—2 in FIG. 1 further illustrating a coating applied to the outer surface of the threaded shank.

As shown in the cross-section of FIG. 2 taken along line 2—2 in FIG. 1, a metallic coating 34 of a predetermined composition is applied to the threaded shank portion 22. The metallic coating 34 is a material of a predetermined composition which is selected for a resultant heating effect when energy is applied thereto. The thickness of the coating is based on the desired heating effect to be achieved and the type of material used. The coating 34 can be applied to the thread forming fastener 20 through any method which results in a thin surface coating, however, plating is a method which is employed in the preferred embodiment. Energy may be applied to the surface coating 34 in any suitable form, including but not limited to RF, ultrasonic and selected frequency AC induction.

When a suitable amount and form of energy is applied to the thread-forming fastener 20 to obtain a suitably elevated temperature of coating 34, the thermoplastic material of the workpiece with which it comes in contact will tend to plastically flow around the features of the threaded shank portion 22 due to the increased energy level and molecular excitation. Since the energy is applied only to the surface coating 34, the entire fastener 20 does not act as a heat sink retaining energy. Therefore, once the energy applied to the threaded fastener 20 is removed, the plastic flow ceases and the thermoplastic material tends to set up very rapidly. Dissipation of energy is enhanced since the thermoplastic material typically dissipates energy more quickly than the coating material 34 used on the thread-forming fastener 20.

The coating material 34 used in forming the thread-forming fastener 20 is specifically adapted for a particular type of thermoplastic material or a range of thermoplastic materials, and certain characteristics of the thermoplastic material such as hardness. The coating material 34 is generally a metallic alloy which is selected to achieve a desired energization characteristic which is related to the thermoplastic material to be energized. Goals of the present invention include reducing the driving torque, increasing the plastic flow of the thermoplastic material around the threads 26 and to relieving residual stresses in the workpiece once the fastener 20 is inserted therein. The present invention achieves these goals and additionally provides a fastener which is securely locked into the workpiece until and unless a sufficient removal force is deliberately applied thereto.

The present invention is applicable to those grades of thermoplastics which because of chemistry and/or reinforcement are extremely hard, tough and non-ductile at ambient temperatures. These factors contribute to cracking and checking, because of the notch sensitivity of the thermoplastic materials at ambient temperatures. The present invention overcomes these problems as described herein.

Figure 3:
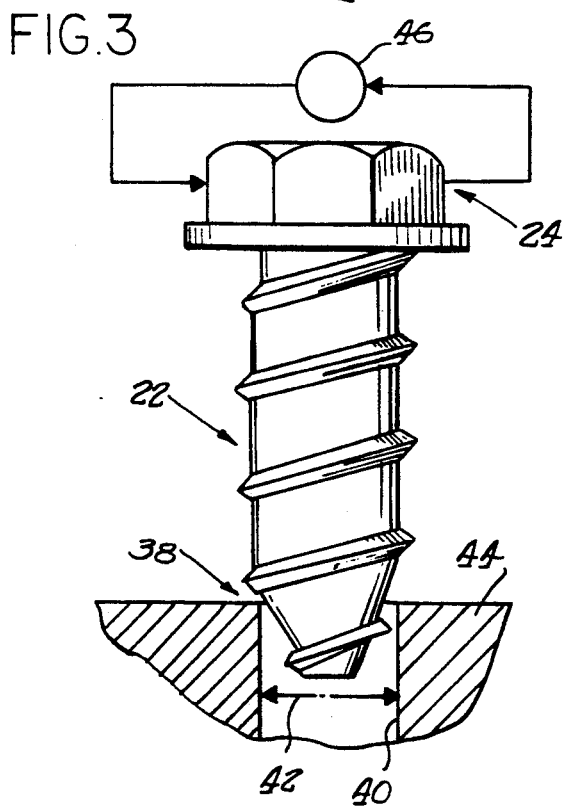
FIG. 3 is a side elevation view, in partial section, of a fastener configured as in FIG. 1 positioned for installation in a pilot hole formed in a thermoplastic workpiece with energy to be applied to the fastener being indicated diagrammatically.
Figure 4:
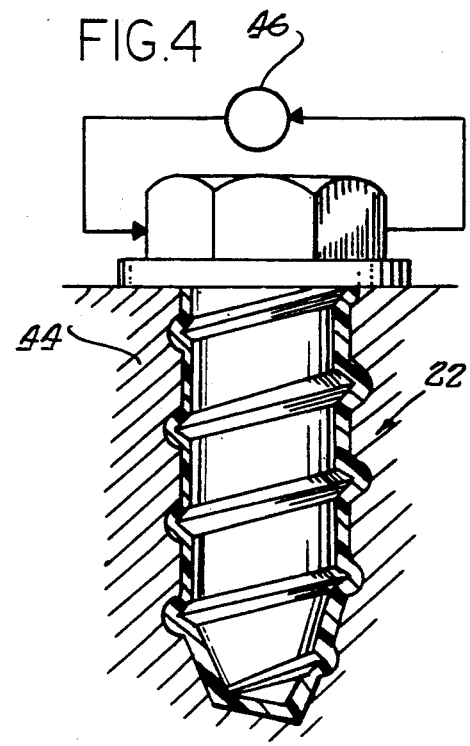
FIG. 4 is a side view of a fastener and workpiece of FIG. 3 in which the fastener has installed in the workpiece and the thermoplastic material has flowed around the threaded shank of the fastener.

As illustrated in FIG. 3 the fastener 20 is positioned so that at least a lead-in portion 38 of the fastener 20 is positioned in a pilot hole 40 being formed of a predetermined diameter 42 in a thermoplastic workpiece 44. Energy is applied to the fastener 20 either through conduction or induction. An energy source 46 as illustrated in FIGS. 3 and 4 is intended to diagrammatically represent a range of energies to be applied to the fastener 20 and is not limited to alternating current type energy sources. The energy source 46 is switched on to apply energy to the fastener 20 to cause heating of the surface coating 34. Once the energy source 46 is applied, the fastener 20 is rotated to drive the threaded shank portion 22 into the pilot hole 40 forming threads therein. Since the surface coating 34 of the fastener 20 is energized by the energy source 46, energy is transferred to the thermoplastic material of the workpiece 44 which plastically flows around the fastener 20 engaging the threads 26 formed thereon.

The method of applying energy to the fastener 20 includes applying electromagnetic energy at a predetermined frequency which is related to given properties of the surface coating 34. Energy transfer to the fastener causes heating of the surface coating 34 to a predetermined temperature resulting in plastic flow of the thermoplastic material in which it is inserted. This method of installing the fastener 20 in thermoplastic also relieves stresses created in the thermoplastic material by the advancing insertion of the fastener 20 therein resulting in preventing crack propogation. Preferably, the surface coating 34 is comprised of a material having a predetermined effective Curie temperature, and the predetermined frequency of the energy applied to the fastener 20 is selected to cause the surface coating 34 to heat to its effective Curie temperature.

Once the fastener 20 has been inserted into the thermoplastic workpiece 44 to a desired depth, the energy source 46 is removed from the fastener 20 whereupon the plastically flowing material immediately surrounding the threads 26 sets up rather quickly due to the rapid dissipation of heat from the surface coating 34 through the thermoplastic workpiece 44. However, energy source 46 may be removed before the fastener 20 is completely inserted with residual heat of the fastener being adequate to maintain material flow for complete insertion. The fastener 20 of the present invention engaged with a workpiece by the method of the present invention is securely retained or embedded in the workpiece 44 and is not easily removable therefrom unless and until an energy source 46 is applied thereto for removal of the fastener 20 from the workpiece 44. As shown in FIG. 4 the plastic material of the workpiece flows into the areas between the threads 26.

As shown in FIG. 5 and with reference to the cross sections in FIGS. 6 and 9, a fastener 20a is formed with at least one radially outwardly extending ramp-like ratchet tooth 48 extending from the unthreaded surface portion 30. Each such tooth 48 extends generally vertically between adjacent turns of the thread 26 formed on the threaded shank portion 22. As shown in FIGS. 6 and 9, each tooth 48 has a tooth face 50 oriented on the tooth 48 for resisting rotation in a direction for removal (as indicated by arrow 51) of the fastener 20a from the workpiece 44. As a result of formation of the teeth 48, underfill areas 52 are formed in thread crest 54, which under fills 52 are abutted by a tooth 48 on either side or both sides thereof. The thread crest 54 as shown in FIG. 6 follows an undulating pattern with the underfills 52 being formed in the crest generally adjacent each tooth 48. The underfills 52 help in thread forming and relieving stress in the workpiece material by enhancing radial inward flow of material. The pressure of the teeth 48 causes inward displacement of the heated material forcing it into the underfills 52 and toward the unthreaded shank 30 of the fastener 20a thus enhancing the degree of contact between the fastener 20a and the workpiece.

As shown in FIG. 6, an insertion rotation direction is indicated by arrow 56 and the tooth face 50 is formed on the side of the tooth 48 opposite the direction of rotation 56. A tooth face angle 58 is defined by an angle relative to a radius 60 extending from a center 62 of the fastener 20a intersecting the point on the unthreaded surface portion 30 which the tooth face 50 intersects. Each tooth 32 extends from a root radius 64 a radial projection distance 66 from between substantially on the order of 1/5 to substantially on the order of ½ of a thread depth 68 of the thread 26.

FIG. 7 shows a fastener 20b similar to the fastener 20a as shown in FIG. 5 in which the ramp-like ratchet teeth 48b are formed at a slope or spiral orientation to a central axis 70b. Similar to the teeth 48 as illustrated in the cross section of FIG. 6, underfill areas 52b are formed on the thread crest 54b between the teeth 48b. FIG. 8 provides a view of the fastener 20b formed with the teeth 48b which has been inserted into a workpiece by employing the Curie effect in driving the fastener 20b into the workpiece. FIG. 9 provides a cross sectional view of a shank portion 22 of a fastener which has been formed with five generally equally spaced apart teeth 48.

The dimensions used in forming the thread-forming fasteners 20a, 20b are adaptable for a particular type of thermoplastic material or a range of thermoplastic materials. For example, the radial projection distance 66 of the tooth 48, and the crest angle 28 are chosen depending on the characteristics of the thermoplastic material such as hardness. A goal of the present invention is to reduce the driving torque, increase plastic flow of the thermoplastic material around the threads 26 and the teeth 48 and to relieve residual stresses in the workpiece once the fastener 20, 20a, 20b is inserted therein. The present invention achieves this goal and additionally provides a fastener 20a, 20b which is securely locked into the workpiece until and unless force is deliberately applied thereto for removal. The teeth 48 prohibit rotation of the fastener 20 thereby resisting removal and prohibit operation of the threads 26 which results in increased pull-out resistance of the threads 26.

While a particular embodiment of the present invention has been shown and described in detail herein, it may be obvious to those skilled in the art that changes and modifications of the present invention, in its various aspects, may be made without departing from the invention in its broader aspects, some of which changes and modifications being matters of routine engineering or design, and others being apparent after study. As such, the scope of the invention should not be limited by the particular embodiment and specific construction described herein, but should be defined in the appended claims and equivalents thereof. Accordingly, the aim of the appended claims is to cover all such changes and modifications as fall within the true spirit and scope of the invention.

The invention is claimed as follows:

1. A thread-forming fastener for use with a workpiece constructed of a thermoplastic material, said fastener comprising: a threaded shank portion having a thread of desired form and a driver head portion; and a coating of a predetermined composition applied to said threaded shank, said predetermined composition being one having a preselected effective Curie temperature for heating said coating upon application of requisite energy thereto during application of said fastener to said workpiece for enhancing the plastic flow of said thermoplastic material during thread forming and for effectively reducing the required drive torque for thread forming by said fastener.

2. A fastener according to claim 1 wherein said thread comprises a spaced thread defining an unthreaded surface portion running adjacent to the thread at substantially a root diameter of the thread and further including in said unthreaded surface portion, at least one radially outwardly extending ramp-like ratchet tooth oriented for resisting rotation in a direction for removal of the fastener relative to the workpiece.

3. A fastener according to claim 2 wherein a maximum radial projection of said tooth from the root diameter is from between substantially on the order of onethird to substantially on the order of seven-eighths of the thread depth of said thread.

4. A fastener according to claim 1 wherein said thread defines a crest angle of substantially on the order of from 30° to 60°.

5. A thread-forming fastener for use with a workpiece constructed of a thermoplastic material, said fastener comprising: a threaded shank portion having a central axis longitudinally extending therethrough and a driver head portion; said threaded shank portion having a spaced thread defining an unthreaded shank portion running adjacent to the thread at substantially the root diameter of the thread and further including, in said unthreaded surface portion, at least one radially outwardly extending ramp-like ratchet tooth oriented for resisting rotation in a direction for removal of the fastener relative to the workpiece; and underfill notches formed generally on a crest of said threads of said fastener and located generally adjacent said ramp-like ratchet teeth.

6. A fastener according to claim 5 further including a coating of a predetermined material being applied to a radially outer surface of said fastener, said coating material being caused to heat to a predetermined temperature related in a predetermined fashion according to properties associated with said coating material upon the application of electromagnetic energy at a predetermined frequency to said coating material.

7. A fastener according to claim 6 wherein said predetermined coating material comprises a material having a predetermined effective Curie temperature.

8. A method of installing a thread-forming fastener in a workpiece constructed of a thermoplastic material comprising: forming a pilot hole in a workpiece of a diameter related in a predetermined fashion to given properties of a selected thermoplastic material and to the nominal diameter of said fastener; placing at least a lead-in portion of said fastener in contact with the pilot hole; rotating said fastener with said lead-in portion in contact with the pilot hole in a direction for advancing said fastener relative to the pilot hole; and simultaneously with said rotating, applying energy to said fastener in such a manner as to cause heating of a radially outer surface portion of said fastener to a predetermined elevated temperature related in a predetermined fashion to given properties of said selected thermoplastic material.

9. A method according to claim 8 and further including applying a coating of a predetermined material to said radially outer surface of said fastener and wherein said applying energy comprises applying electromagnet energy at a predetermined frequency related in a predetermined fashion to given properties of said predetermined coating material to cause heating of said coating material to a predetermined temperature related in a predetermined fashion to said given properties of said coating material and to said given frequency of electromagnetic energy.

10. A method according to claim 9 wherein said predetermined coating material comprises a material having a predetermined effective Curie temperature and wherein said predetermined frequency is selected to cause the material to heat to its effective Curie temperature.

* * * * *

UNITED STATES PATENT AND TRADEMARK OFFICE
CERTIFICATE OF CORRECTION

PATENT NO. : 5,133,630

DATED : July 28, 1992

INVENTOR(S) : Barry J. Hughes

It is certified that error appears in the above-identified patent and that said Letters Patent is hereby corrected as shown below:

Column 3, Lines 4-5 "in accordance with of the invention"; should be

— in accordance with one embodiment of the invention;—

Signed and Sealed this

Eighteenth Day of October, 1994

Attest:

BRUCE LEHMAN

*Attesting Officer*  *Commissioner of Patents and Trademarks*